United States Patent [19]

Bononi

[11] Patent Number: 4,732,464

[45] Date of Patent: Mar. 22, 1988

[54] NOSEPADS FOR EYEGLASSES

[76] Inventor: Walter H. Bononi, Zeppelinstrasse 9, 7012 Fellbach-Schmiden, Fed. Rep. of Germany

[21] Appl. No.: 945,172

[22] Filed: Dec. 18, 1986

Related U.S. Application Data

[63] Continuation of Ser. No. 616,315, Jun. 1, 1984, abandoned.

[30] Foreign Application Priority Data

Jun. 1, 1983 [DE] Fed. Rep. of Germany ....... 3319827

[51] Int. Cl.$^4$ .......................... G02C 1/00; G02C 5/12
[52] U.S. Cl. ..................................... 351/88; 351/136; 351/132; 351/138
[58] Field of Search ...................... 351/76, 78, 79, 80, 351/81, 82, 88, 132, 136, 137, 138, 139

[56] References Cited

U.S. PATENT DOCUMENTS

| 2,027,109 | 1/1936 | Lauber et al. | 351/138 |
| 4,302,080 | 11/1981 | Bononi | 351/139 |

FOREIGN PATENT DOCUMENTS

| 757047 | 5/1954 | Fed. Rep. of Germany | 351/138 |
| 1251549 | 10/1967 | Fed. Rep. of Germany | 351/138 |
| 287697 | 3/1928 | United Kingdom | 351/138 |
| 308899 | 4/1929 | United Kingdom | 351/138 |

Primary Examiner—Rodney B. Bovernick

[57] ABSTRACT

In a pair of eyeglasses, a stud-shaped pad is secured in a through-hole in a support plate on the side of an eyeglass wearer's nose. A stem extends from the main plate of the pad, which rests on the support plate, passing through the through-hole and is broadened at the rear side into the shape of a fastening member. The pad is made of extremely soft plastic. The pad can at any time be snapped in and out by the wearer.

11 Claims, 7 Drawing Figures

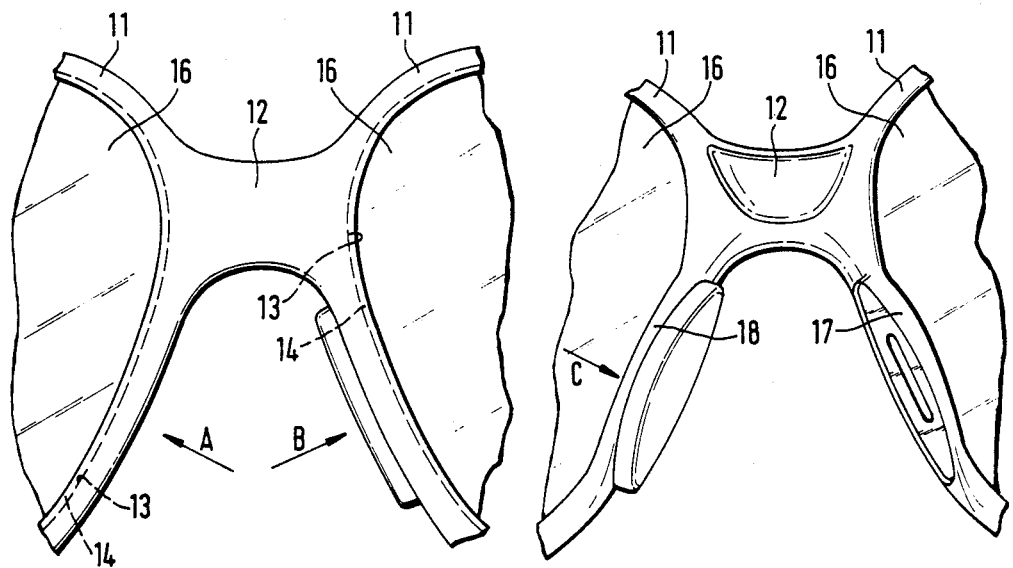
Fig. 1
Fig. 2
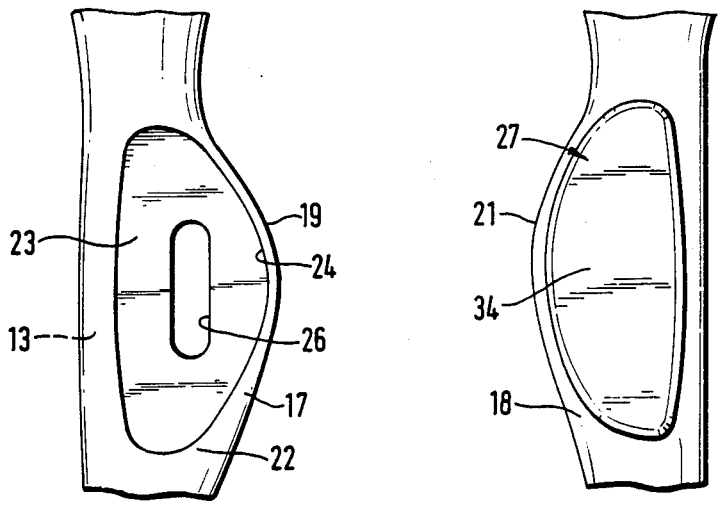
Fig. 3
Fig. 4

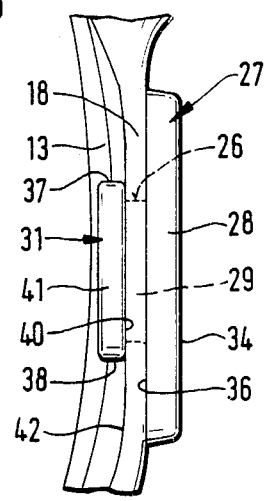
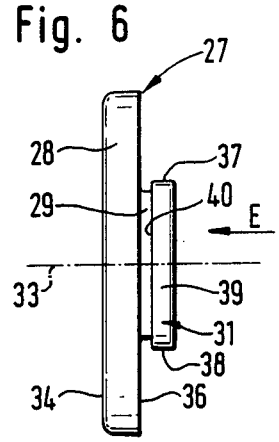
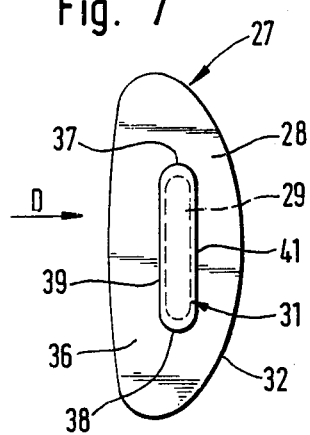

NOSEPADS FOR EYEGLASSES

This is a continuation of co-pending application Ser. No. 616,315 filed on June 1, 1984, now abandoned.

The invention relates to a pair of glasses having two hard support plates with inner and outer surfaces for support on the sides of the wearer's nose, starting at the eye rims below the bridge and shaped outwards to the rear, and having a lens groove in the inner periphery of each eye rim.

BACKGROUND OF THE INVENTION

Glasses of this kind, at least in the nose area, are mostly made of plastic, sometimes also of metal. Although the support plates have a relatively large surface area, they are hard and have a smooth surface. Consequently the glasses can slip, especially when the skin is wet and/or the glasses are stressed cyclically, as for example by eddies of air. The distance between the rear face of the lens and the cornea (cornea apical distance) must, especially with a relatively high dioptric number, be maintained in the glasses actually made exactly as measured in the optician's testing glasses, because with an increase of the cornea apical distance, e.g., with a pair of glasses slipping off the nose, with a divergent lens the refraction becomes stronger and the image smaller, and with a convergent lens the refraction becomes weaker and the image larger.

OBJECT AND STATEMENT OF THE INVENTION

The object of the invention is to provide an arrangement which both satisfies esthetically and also removes in a practicable manner seating problems of the glasses on the nose of the wearer by means which are constructionally simple and inexpensive.

According to the invention this object is achieved as follows:

(a) a through-hole is provided in each support plate which ends to the rear of the lens groove; and (b) a pad of material of Shore D hardness in the range of approximately 10-30 has a cuff-link stud shape, having a main plate resting on each support plate, a stem passing through the through-hole, and a fastening plate resting on the outer surface of the support plate to the rear of the lens groove.

By this means even a layman can snap the pads in and out, for example in a case where the pads are discolored or need to be disinfected or the like. Now the ridge of the nose makes little or no contact with the bridge and nevertheless the glasses sit both gently and securely. The amount of additional material used is so minimal that it is noticed only on close examination. It is no problem to convert existing glasses in the manner according to the invention.

Advantageously, the invention includes the following additional features

The through-hole is an oblong hole. This feature makes it possible, with elongate main plates, to prevent these rotating about the stem. Should circularly cylindrical main plates be used, then rotation would not matter.

The oblong hole extends in the longitudinal direction of the eye rim. This feature makes it possible to provide longer oblong holes and thus absorb torques even better than if one had them extending in the transverse direction. In the latter direction only short oblong holes would be possible.

The main plate has an outer edge, and a recess is provided in the inner surface of the support plate, and the recess has an edge which holds the edge of the main plate for a very small part of its height. These features result in an esthetic improvement, to the extent that one then cannot see through between the rear side of the main plate and the eye rim. Furthermore the socket takes over a part of those forces which tend to displace the main plate. Such forces with effective components perpendicular to the main plate only urge the latter yet further into the socket.

The main plate has a rear side that is flat and the support plate has a zone lying opposite to the flat rear side of the main plate that is similarly flat. These features simplify the tool for manufacture of the pad and also for manufacture of the eye rim. Furthermore a flat plane surface absorbs the forces better and cleaning becomes simpler.

A left and the right pad which have the same shape. This feature makes it necessary to manufacture and stock only one kind of pad.

The stem has a longitudinal cross section complementary to the oblong hole. This feature means that the stem totally fills the oblong hole, so that its cross section is of maximum magnitude and the forces acting produce specifically lower loadings than if the stem were not to fill the oblong hole fully.

The stem is slightly shorter than the through-hole is deep. This feature causes the locking rim and the main plate to be pulled together with a slight pretress, so that not play occurs.

The locking bar has an inner side that only slightly overlaps the through-hole. This feature makes it easier to snap the locking rim through the through-hole.

The locking has two narrow sides and two long sides and overlaps the through-hole more on its two narrow sides than on its long sides. These features means that on the one hand the locking rim is optimally small, which signifies low consumption of material and aesthetically desirable properties, and on the other hand it can be readily snapped through and yet is securely held.

Main plates of different thickness are provided. This features enables the height of the rim to be readily regulated.

The pad is integrally homogeneous. This feature enables special facings on the pad to be dispensed with, so that it becomes easier to manufacture, and does not display any additional esthetic individually, and its softness can be fully utilized. Even if the rear side of the main plate rests on the support plate, the main plate is after all so thick, that the skin is "aware" of the support lug through the main plate either not at all or only slightly.

DESCRIPTION OF DRAWINGS

The invention will now be described with reference to a preferred exemplary embodiment. In the drawings:

FIG. 1 shows the front elevation of the middle zone of a pair of glasses, one of the pads having been removed.

FIG. 2 shows the rear view of FIG. 1.

FIG. 3 shows a view according to the arrow A in FIG. 1,

FIG. 4 shows a view according to the arrow B in FIG. 1,

FIG. 5 shows a view similar to the arrow C in FIG. 2, but in the plane of the main plate, FIG. 6 shows a view of the pad according to the arrow D in FIG. 7, FIG. 7 shows a view of the pad according to the arrow E in FIG. 6, FIGS. 3–7 on a scale 50% larger than FIGS. 1 and 2.

DETAILED DESCRIPTION

A pair of glasses made of plastic, and not shown in detail, has two eye rims 11, which are integrally connected together by a bridge 12.

The eye rims 11 have lens grooves 13 of V-shaped cross section in which are held the beveled edges 14 of lenses 16. Below the bridge 12 lugs for support on the sides of the nose are molded out rearwards. Their main planes diverge rearwards. Their rear edges 19, 21 extend like a drawn bow, as FIGS. 3 and 4 show. The greatest thickness of the support plates 17, 18 amounts to about 1.4 mm. A recess 23 is incorporated into the inner surface, the plane of the recess lying about 0.5 mm deeper than the surface 22. There thereby arises an equally deep holding edge 24, which according to FIG. 3 has a somewhat kidney-shaped line and in the area of its greater curvature is at a short uniform distance from the edge 19. The left-hand zone as seen in FIG. 3 of the socket edge 24 lies partly above the lens groove 13. The recess 23 is in itself even and of equal depth throughout. In the middle of the recess 23 there is provided an oblong through hole 26, the longer sides of which are parallel to one another and the shorter sides of which are produced by a radius.

A pad 27 is made of silicone rubber of a Shore D hardness of 17. It has a main plate 28, a stem 29 and a locking bar 31. The main plate 28 is 2 mm thick and, as a comparison of FIG. 3 with FIG. 7 reveals, it follows with its outer edge 32 the socket edge 24. The pad 27 is symmetrical relative to its central plane 33, so that it can be used both on the support lug 17 and on the support lug 18. The front face 34 of the main plate 28 projects beyond the surface 22 by almost the total thickness of the main plate 28. The rear face 36 of the main plate 28 rests over its whole surface against the floor of the recess 23. In its central zone, the rear face 36 merges into the stem 29, which has the same cross-sectional shape as the oblong hole 26. The stem 29 fills the oblong hole 26 fully and without play. The stem 29 is however slightly shorter than the oblong hole 26 is deep. The stem 29 also is symmetrical relative to the central plane 33. The stem 29 merges into a locking bar 31, which projects on all sides slightly beyond the periphery of the stem 29, but farther on its narrow sides 37, 38 than on its long sides 39, 41. With the inner edge 4 so formed, the locking bar 31 rests on the outer surface 42 of the support lug 17, 18.

What is claimed is:

1. A pair of eyeglasses comprising:

two eye rims and a bridge with a lens groove in the inner periphery of each eye rim, two hard support plates, having an outer edge and inner and outer surfaces, starting at said eye rims below said bridge and shaped outwards to the rear to support, at said inner surfaces, the eyeglasses on the flanks of the wearer's nose, said support plates having through-holes which open to the rear of said lens grooves, two pads of a material of Shore-D hardness in the range of 10–30, retained removably against said support plates, said pads having the shape of cuff-link studs with a main plate having inner and outer surfaces and an outer edge that is smaller than said outer edge of said support plate, said main plate being arranged and adapted to rest with its entire inner surface supported against said inner surface of said support plate and within said outer edge of said support plate, at the flanks of the wearer's nose, a stem on the back of said main plate, said stem being slightly shorter than the depth of said through-holes on said support plate, and a fastening member secured to said stem arranged and adapted to be pressed removably through said through-hole in said support plate to rest against said outer surface of said support plate to the rear of said lens groove, said support plates having recesses on said inner surfaces of said support plates, which contact said main plates to inhibit rotation thereof relative to said support plates.

2. Pair of glasses as claimed in claim 1, wherein said recesses have edges which hold said outer edges of said main plate for a very small portion of their height.

3. Pair of glasses as claimed in claim 1, wherein the through-hole is an oblong hole.

4. Pair of glasses as claimed in claim 3, wherein the oblong hole extends in the longitudinal direction of the eye rim.

5. Pair of glasses as claimed in claims 1, wherein the main plate has a rear side that is flat and the support plate has a zone lying opposite to the flat rear side of the main plate that is similarly flat.

6. Pair of glasses as claimed in claim 1, comprising a left and the right pad which have the same shape.

7. Pair of glasses as claimed in claims 3, wherein the stem has a longitudinal cross section complementary to the oblong hole.

8. Pair of glasses as claimed in claim 1, wherein the fastening member has an inner side that only slightly overlaps the through hole.

9. Pair of glasses as claimed in any one of claims 3, 7 or 8, wherein the fastening member has two narrow sides and two long sides and overlaps the through-hole more on its two narrow sides than on its long sides.

10. Pair of glasses as claimed in claim 1, wherein main plates of different thickness are provided.

11. Pair of glasses as claimed in claim 1, wherein the pad is integrally homogeneous.

* * * * *